(12) United States Patent
Walker

(10) Patent No.: US 6,304,461 B1
(45) Date of Patent: Oct. 16, 2001

(54) DC POWER CONVERTER HAVING BIPOLAR OUTPUT AND BI-DIRECTIONAL REACTIVE CURRENT TRANSFER

(75) Inventor: James T. Walker, Palo Alto, CA (US)

(73) Assignee: Supertex, Inc., Sunnyvale, CA (US)

( * ) Notice: Subject to any disclaimer, the term of this patent is extended or adjusted under 35 U.S.C. 154(b) by 0 days.

(21) Appl. No.: 09/593,934

(22) Filed: Jun. 15, 2000

(51) Int. Cl.[7] .................................................. H02M 3/335
(52) U.S. Cl. .............................................. 363/17; 363/127
(58) Field of Search ................................. 363/15, 16, 17, 363/24, 89, 127, 125

(56) References Cited

U.S. PATENT DOCUMENTS

| | | | | |
|---|---|---|---|---|
| 5,541,828 | * | 7/1996 | Rozman | 363/21 |
| 5,870,299 | * | 2/1999 | Rozman | 363/127 |
| 6,104,623 | * | 8/2000 | Rozman | 363/21 |
| 6,137,698 | * | 10/2000 | Yukawa et al. | 363/25 |
| 6,219,264 | * | 4/2001 | Drobnik | 363/127 |

* cited by examiner

*Primary Examiner*—Peter S. Wong
*Assistant Examiner*—Gary L. Laxton
(74) *Attorney, Agent, or Firm*—Weiss & Moy, P.C.; Harry M. Weiss; Jeffrey D. Moy

(57) ABSTRACT

A dc power converter having bipolar output and bi-directional reactive current transfer is disclosed. The dc power converter comprises: a direct current source; a modulator coupled to the direct current source, the modulator comprising at least two switch means for generating a waveform pulse; a transformer primary winding capacitively coupled to the modulator; at least two transformer secondary windings magnetically coupled to the transformer primary winding; and two synchronous rectifiers coupled to a first and second secondary winding respectively of the at least two transformer secondary windings. The first and second synchronous rectifiers each comprise: a switching means for interrupting a current path connected in series with a respective secondary winding first polarity pole, and a capacitor coupled in series with the switching means. The first secondary winding second polarity pole is coupled to the second secondary winding first polarity pole such that an output voltage from the first synchronous rectifier is in electrical opposition to a second output voltage from the second synchronous rectifier.

16 Claims, 6 Drawing Sheets

DC POWER CONVERTER HAVING BIPOLAR OUTPUT AND BI-DIRECTIONAL REACTIVE CURRENT TRANSFER

BACKGROUND OF THE INVENTION

1. Field of the Invention

This invention relates to direct current to alternating current power converters, and more specifically, to a direct power converter having bipolar output and bidirectional reactive current transfer.

2. Description of the Related Art

Power converters transform direct current, unipolar, energy to alternating current, bipolar, energy, or perform the reverse transformation. Generally, however, both functions cannot be performed at the same time. Unfortunately however, when the load on the ac output of a converter is reactive in nature, i.e. other than purely resistive, a reverse current condition can occur due to the capacitive or inductive reactive load. And because diodes are generally present in the power flow path of dc to ac power converters the diodes will block any attempted reverse current flow from a reactive load back into the actual dc power source. Therefore when reactive loads are present, energy is wasted in the power converter as the reactive load's reverse current flow is blocked resulting in component heating, power losses and inefficiencies. Furthermore, even among those power converters that state that they return power to the source, when the output voltage Vout is ≦Vin, the source, power typically is not returned to the source.

Additionally, in the case of unipolar dc to bipolar ac power converters, complex control circuits having feedback control are required in order to achieve linear proportional control of the output value and polarity. And in the case of reverse power flow as above, an inability to control the output voltage is prevalent. Moreover, many converters that utilize switching circuitry have problems with cross over distortion.

Furthermore, in many unipolar dc to bipolar ac power converters, a problem that causes efficiency losses and possible component damage exists. Power converters by their nature use switches, mechanical or solid state to create the desired ac. In many dc power converters there may be current flowing in the switches at the time that the switch turns OFF. This sudden current cutoff can cause large voltages to be induced into the power converter circuitry which leads to circuit damage and loss of efficiency.

Therefore a need existed for a power converter to transform direct current, unipolar, energy to alternating current, bipolar, energy having a feature of returning reactive energy back to the source in the presence of a reactive load for improved energy efficiency.

Another need existed for a power converter to transform direct current, unipolar, energy to alternating current, bipolar, energy having a feature of returning energy to the source even when the output voltage Vout is ≦Vin, the source.

A further need existed for a power converter to transform direct current, unipolar, energy to alternating current, bipolar, energy having a feature of a simple control circuit without feedback control that achieves linear proportional control of the power converter output value and polarity, while also possessing no cross over distortion.

Yet another need existed for a power converter to transform direct current, unipolar, energy to alternating current, bipolar, energy having a feature whereby switches are not interrupting reverse power flows thus preventing component damage and providing increased energy efficiency.

SUMMARY OF THE INVENTION

It is an object of the present invention to provide a power converter to transform direct current, unipolar, energy to alternating current, bipolar, energy having a feature of returning reactive energy back to the source in the presence of a reactive load for improved energy efficiency.

It is another object of the present invention to provide for a power converter to transform direct current, unipolar, energy to alternating current, bipolar, energy having a feature of returning energy to the source even when the output voltage Vout is ≦Vin, the source.

It is a further object of the invention to provide a power converter to transform direct current, unipolar, energy to alternating current, bipolar, energy having a feature of a simple control circuit without feedback control that achieves linear proportional control of the power converter output value and polarity, while also possessing no cross over distortion.

It is yet another object of the invention to provide a power converter to transform direct current, unipolar, energy to alternating current, bipolar, energy having a feature whereby switches are not interrupting reverse power flows thus preventing component damage and providing increased energy efficiency.

The foregoing and other objects, features, and advantages of the invention will be apparent from the following, more particular, description of the preferred embodiment of the invention, as illustrated in the accompanying drawings.

BRIEF DESCRIPTION OF THE PREFERRED EMBODIMENTS

According to one aspect of the invention, a dc power converter having bipolar output and bidirectional reactive current transfer is disclosed. The dc power converter having bipolar output and bidirectional reactive current transfer comprises: a direct current source; a modulator coupled to the direct current source, the modulator comprising at least two switching means for generating a waveform pulse; a primary winding of a transformer capacitively coupled to the modulator; at least two secondary windings of the transformer magnetically coupled to the primary winding of the transformer, wherein the at least two secondary windings are bifilar wound; a first synchronous rectifier coupled to a first secondary winding of the at least two secondary windings; and a second synchronous rectifier coupled to a second secondary winding of the at least two secondary windings. The first synchronous rectifier comprises: a first switching means for interrupting a current path connected in series with the first secondary winding, and a first capacitor coupled in series with the first switching means. The second synchronous rectifier comprises: a second switching means for interrupting a current path connected in series with the second secondary winding; and a second capacitor coupled in series with the second switching means. The do converter having bipolar output and bidirectional reactive current transfer comprises: the first secondary winding coupled to the second secondary winding such that an output voltage from the first synchronous rectifier is in electrical opposition to a second output voltage from the second synchronous rectifier.

According to another aspect of the invention, a dc power converter having bipolar output and bidirectional reactive current transfer is disclosed. The dc power converter having bipolar output and bidirectional reactive current transfer comprises: a direct current source; a modulator coupled to the direct current source, the modulator comprising at least two switching means for generating a waveform pulse; a primary winding of a transformer capacitively coupled to the modulator; at least two secondary windings of the transformer magnetically coupled to the primary winding of the transformer; a first synchronous rectifier coupled to a first secondary winding of the at least two secondary windings; and a second synchronous rectifier coupled to a second secondary winding of the at least two secondary windings. The first synchronous rectifier comprises: a first switching means for interrupting a current path connected in series with the first secondary winding, and a first capacitor coupled in series with the first switching means. The second synchronous rectifier comprises: a second switching means for interrupting a current path connected in series with the second secondary winding; and a second capacitor coupled in series with the second switching means. The dc power converter having bipolar output and bidirectional reactive current transfer comprises: the first secondary winding coupled to the second secondary winding such that an output voltage from the first synchronous rectifier is in electrical opposition to a second output voltage from the second synchronous rectifier; and at least one clamp diode connected in parallel with at least one switching means. The at least one switching means comprises one or more of: the at least two switching means for generating a waveform pulse; the first switching means for interrupting a current path, and the second switching means for interrupting a current path. The first secondary winding and the second secondary winding are of the same polarity and the at least two secondary windings are bifilar wound.

According to a further aspect of the invention, a dc power converter having bipolar output and bidirectional reactive current transfer is disclosed. The dc power converter having bipolar output and bidirectional reactive current transfer comprises: a direct current source; a modulator coupled to the direct current source, the modulator comprising at least two switching means for generating a waveform pulse; a primary winding of a transformer capacitively coupled to the modulator; at least two secondary windings of the transformer magnetically coupled to the primary winding of the transformer; a first synchronous rectifier coupled to a first secondary winding of the at least two secondary windings; and a second synchronous rectifier coupled to a second secondary winding of the at least two secondary windings. The first synchronous rectifier comprises: a first switching means for interrupting a current path connected in series with the first secondary winding, and a first capacitor coupled in series with the first switching means. The second synchronous rectifier comprises: a second switching means for interrupting a current path connected in series with the second secondary winding; and a second capacitor coupled in series with the second switching means. The dc power converter having bipolar output and bi-directional reactive current transfer comprises: the first secondary winding coupled to the second secondary winding such that an output voltage from the first synchronous rectifier is in electrical opposition to a second output voltage from the second synchronous rectifier.

DESCRIPTION OF THE PREFERRED EMBODIMENTS

An objective of the design presented here is to convert a unipolar DC input voltage to a bipolar output voltage with linear proportional control of the output value and polarity. By using pulse duty cycle control of the input signal driving the converter, the output signal may be controlled in both polarity and magnitude. This permits easy synthesis of an alternating voltage output, such as an AC sine wave with an inherent lack of cross-over distortion. A feature of the apparatus presented here is that the power conversion is bi-directional, permitting power flow in both directions between the load and the actual dc source. This ability to absorb reverse power flow assists with driving reactive loads and loads with a DC offset in series.

Figure 1:
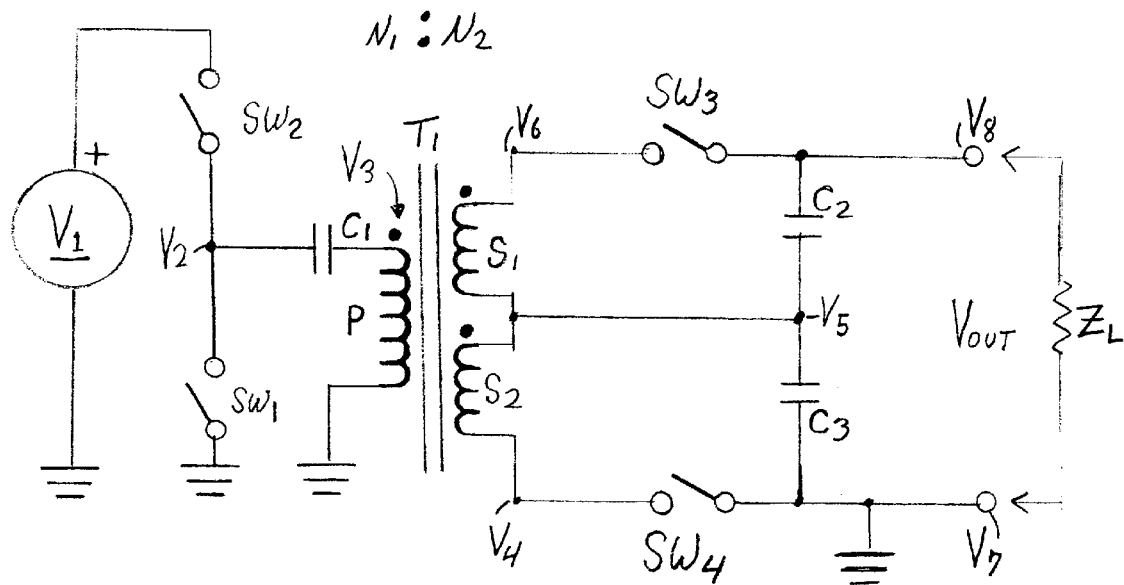
FIG. 1 shows a simplified circuit diagram of the present invention, a dc power converter having bipolar output and bidirectional reactive current transfer.
Figure 2:
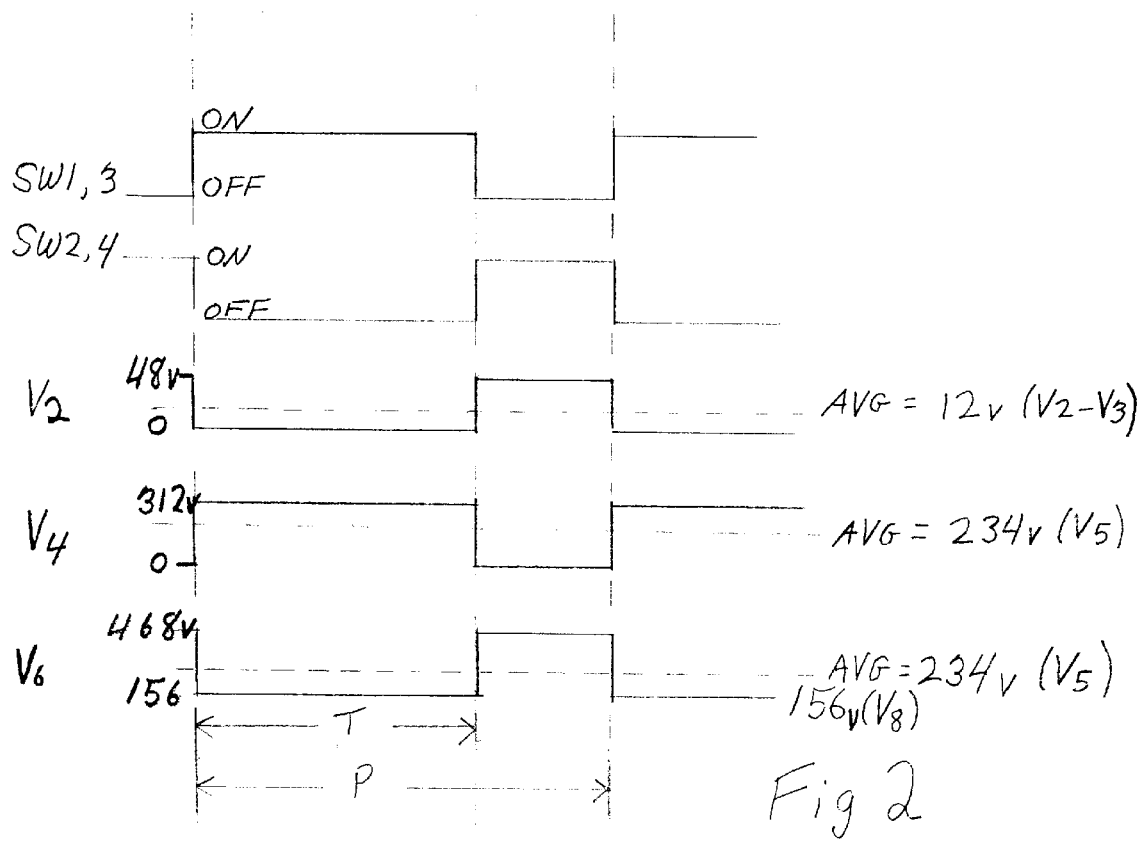
FIG. 2 shows ac timing and voltage diagram depicting the input voltage V1, the timing of the drive switches S1–4, and the output of the simplified circuit shown in FIG. 1.

Referring to FIG. 1, a simplified circuit diagram of an embodiment of the present invention, a dc power converter having bipolar output and bidirectional reactive current transfer, (the "dc power converter 10" hereinafter) is shown. Referring also to FIG. 2, a timing and voltage diagram depicting the input voltage V1, the timing of the drive switches S1–4, and the output of the simplified circuit of FIG. 1 is shown.

In this embodiment of the present invention, a transformer T1 is used to transfer power between two switches SW1 and SW2 connected in series and two switches SW3 and SW4 connected in separate secondary circuits. During operation, the switches SW1 and SW2 operate alternately, as is shown in FIG. 2, generating a rectangular wave at V2 with varying duty cycle. The AC component of this rectangular waveform is passed by C1 to the transformer T1 primary P. The secondary windings S1 and S2 of the transformer T1 in cooperation with the switches SW3, SW4, and C2, C3 comprise a synchronous rectifier that recovers the average component of the rectangular waveform input to the primary P of the transformer T1.

In this embodiment of the dc power converter 10 of the present invention, the rectangular drive waveform at V2 resulting from the operation of SW1 and SW2 may be at frequencies of 20 kHz or more, whereas the signal frequency being synthesized for the output is less than 100 Hz. For purposes of circuit analysis, the output signal at 100 Hz could be treated as a DC voltage with an instantaneous value corresponding to the portion of the output waveform being synthesized. In many cases, the output waveform will be a sine wave, although the dc power converter 10 of the present invention can generate any practical waveform within its voltage, power, slew rate, and bandwidth capabilities.

The operation of the dc power converter 10 is as follows. The switches SW1 and SW2 are closing and opening alternately. Switch SW1 is closed for a time T and SW2 is alternately closed for a time 1−T, and the switching period is P. For example, when the primary side switch SW1 is closed, the secondary side switch SW3 is also closed and switch SW4 is an open circuit, and it during the alternate half of the cycle, when the primary side switch SW2 is closed, the secondary side switch SW4 is now closed and switch SW3 is open.

When switch SW1 is closed its duty cycle D=T/P. For the example waveforms shown in FIG. 2, the duty D is chosen to be 0.75. Therefore, given an exemplary input voltage V1 equal to 48 volts, the average voltage at point V2 between switches SW1 and SW2 is V1*(1−D)=V1*0.25=12 volts.

The capacitor C1, coupled between the switches SW1 and SW2 junction and the transformer T1 primary P, passes the AC component of the rectangular waveform at V2 to the transformer T1 primary P, and blocks the DC average voltage. The transformer T1 steps up the primary voltage to the two secondaries by the ratio M=N2/N1, which is M=6.5 for this embodiment.

In reference to the lower half secondary circuit of the dc power converter 10, given an initial condition of the primary switch SW2 being closed and the secondary side switch SW4 also being closed, the most negative portion of the waveform at V4 will be clamped to the V7 level during this closed condition of SW2 and SW4. Note that for convenience, the output voltage terminal V7 is shown as connected to circuit ground, but V7 could be connected to any other convenient reference voltage if desired without altering the generality of the circuit operation and the scope of the present invention.

Continuing with SW2 and SW4 closed, the voltage present at V4 ranges from 0 volts (being at a nominal ground) when SW4 is closed to a value equal to V1*M=312 volts when SW4 is open. Thus, the average voltage appears at the opposite end of the secondary winding at V5, and is found to be V5=V1*M*D=234 volts.

The remaining upper half of the secondary circuit comprising transformer T1 secondary S1, SW3 and C2 operates as a synchronous rectifier for the upper half of the secondary output voltage. The voltage from the upper half secondary circuit is then subtracted from the average voltage generated by the lower half secondary circuit as was detailed above.

The waveform at V6 swings from 156 volts to 468 volts for the example being cited as switches SW1 and SW2 alternate open and closed, with an average value of 234 volts from the winding connection to V5 as calculated above. The voltage developed across C2 by the rectification process will be V8−V5=−V1*M*(1−D)=−78 volts for the case shown here. The negative sign occurs because of the reversed secondary winding polarity and the switch SW3 closure phasing.

The final output voltage is the difference between the voltages developed across C2 and C3, and is VOUT=V8−V7=(V8−V5)+V5. Combining the equations, VOUT=(2*D−1)*M*V1. Note that with the limits of 0 and 1 for D, the output voltage can vary over the range of +/−(M*V1), although in a practical circuit, the duty cycle will stay away from the values of 0 and 1 since the internal circuit currents would have to become very large, leading to excessive power losses.

It is observed from the equations that V5=V1*M*D, and therefore V5 will always be a positive voltage for any value of D in the range 0 to 1 and for M positive. If the transformer T1 polarity is changed to make M negative, or if the sequence of operation of SW3 and SW4 is reversed (which produces equivalent results), then V5 will be always negative for the same conditions. The fact that V5 is unipolar assists in the choice of a practical semiconductor switch for SW3 and SW4. The embodiment discussed herein gives a positive unipolar voltage at V5.

In reference to the construction of the dc power converter 10 of the present invention, the capacitors C1, C2, and C3 should be chosen to have a value such that they behave as a low impedance, or short circuit, for the high frequency switching waveforms used to transmit energy through the transformer T1, and behave as open circuits at the signal frequency being synthesized. The transformer T1 is required to have low losses at the switching frequency only, and does not have to operate for the signal frequency. Due to the high switching frequency, the transformer T1 may be small and light weight despite the large amount of power being generated.

The dc power converter 10 of the present invention may be realized using any type of switches for SW1 to SW4. Both mechanical and electronic switches will work satisfactorily. For modern designs, electronic switches which may be used include bipolar junction transistors (BJT), metal oxide silicon field effect transistors (MOSFET), insulated gate bipolar junction transistors (IGBJT), or any of a number of other devices. Vacuum tubes of many sorts could also be used.

The capacitors C2 and C3 should be low loss capacitors at the pulse switching frequency, i.e. have a small effective series resistance (ESR). Note also that in the dc power converter 10 the voltages that appear across capacitors C1, C2, and C3 are unipolar, even though the output voltage is bipolar.

Therefore these capacitors may use polarized capacitors if desired. Also, if one or more of the secondary capacitors are non-polarized, other capacitor arrangements may be used which produce equivalent results.

The load impedance ZL may be any value without restriction without impairing the theoretical operation of the present invention. Thus, loads which incorporate capacitive, inductive, negative resistance, or non-linear elements will be handled correctly.

Turning now to an important feature of the present invention. During some portion of the synthesized waveform generation, loads which are other than purely resistive will cause energy flow from a capacitive or inductive load back to the power source V1. This reverse energy flow occurs because inductive or capacitive loads will have current and voltage out of phase from each other which for a reverse polarity current flow would result in a reverse energy flow. Additionally, reverse energy flow may occur due to the reactive energy stored in the secondary capacitors C2 and C3.

This low loss transmission of energy from the load ZL back to the source V1, from an inductive/capacitive load is facilitated by the architecture of the dc power converter 10. This feature of the present invention is possible because the power flow path from source to load does not comprise any diodes that would block the reverse current flow. The direction of the instantaneous power flow will depend on the voltages V1 and Vout, the switching duty cycle ratio D, and the transformer ratio M. The amount of current will be limited only by the parasitic resistances of the switches SW1–4, the transformer T1, and the capacitors C1–3.

Figure 3:
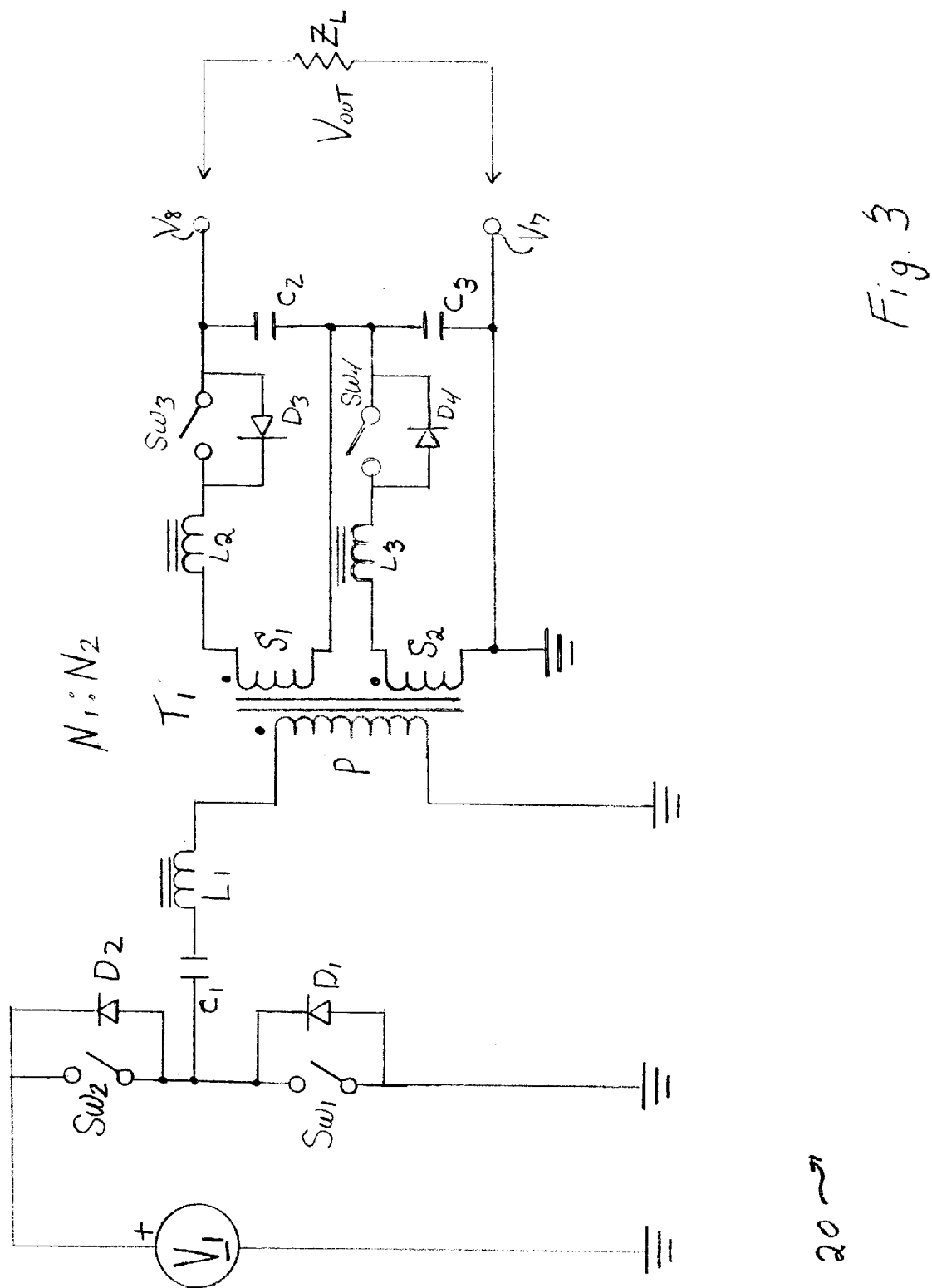
FIG. 3 shows a preferred embodiment of the simplified circuit diagram of the present invention, a dc power converter having bipolar output and bidirectional reactive current transfer.

Referring now to FIG. 3, a preferred embodiment of the simplified circuit diagram of the present invention, a dc power converter ("dc power converter 20" hereinafter) having bipolar output and bidirectional reactive current transfer is shown. This preferred embodiment of the present invention shows the dc power converter 20 circuit rearranged in topology and also shows the transformer T1 leakage inductances L1–3. L1–3 are representative of the parasitic load of the transformer T1 primary and secondary windings P, S1–2.

In both the dc power converter 10 of FIG. 1 and the dc power converter 20 of FIG. 3, there may be current flowing in the switches SW3 and SW4 at the time that the switch turns OFF. This sudden current cutoff will cause a large voltage to be induced in the transformer parasitic leakage inductances L2–3. These induced voltages can damage the switches SW103 and SW104 by causing voltage breakdown. In addition, the energy stored in the leakage inductance L2–3 may end up being dissipated in one of the switches SW103 and SW104 thus reducing the available circuit efficiency. These effects have increasing significance as the power handling capacity of the dc power converter 20 is increased. Therefore, to provide a preferred embodiment of the present invention, the switches SW3 and SW4 are placed as shown in FIG. 3, coupled to the same pole of their respective secondary windings S1 and S2 as indicated by the transformer polarity dot convention.

With the topology change in FIG. 3, the transformer secondaries S1 and S2 may now also be wound as a single bifilar winding. This causes the inductances L2 and L3 to be effectively very small, so that L1 essentially represents all of the transformer T1 leakage inductance. The bifilar interwinding capacitance, which is relatively large, has only a DC voltage across it, and will not cause power loss. This schematic shows diodes D1 through D4 across their associated switches SW1–4 respectively. Diodes may be present in this fashion as the voltages applied to all 4 switches SW1–4 are unipolar. The diodes D1–4 will act to carry reactive current from the transformer leakage reactances L1–3 to the load ZL or source V1 without significant power loss. In particular, when switch SW3 opens, diode D4 routes the inductively stored energy from L3 to C3, and when SW4 opens, diode D3 similarly routes the inductively stored energy from L2 to C2. This is possible because of the intimate coupling between the transformer T1 secondaries S1 and S2 as a result of the bifilar winding arrangement. Diodes D1 and D2 operate in a similar manner to couple primary leakage inductance energy from the transformer leakage reactance L1 back to the energy source V1.

Note also, as explained for the dc power converter 10 of FIG. 1, that similarly in this dlc power converter 20 of FIG. 3, that the voltages that appear across capacitors C1, C2, and C3 are unipolar, even though the output voltage is bipolar. Therefore these capacitors C1–3 may use also polarized capacitors if desired. And, if one or more of the secondary capacitors are non-polarized, other capacitor arrangements may be used which produce equivalent results.

Referring now to FIG. 4a–d, four alternative circuit arrangements of capacitors C1, C2, C3, and C4 providing four alternative embodiments for each of the dc power converters 10 and 20 of either FIG. 1, or FIG. 3 are shown. It should be noted that these alternative circuit arrangements only address the placement of the capacitors C1–4 and are not meant to be limiting in regard to the presence or lack of other components.

Figure 4A:
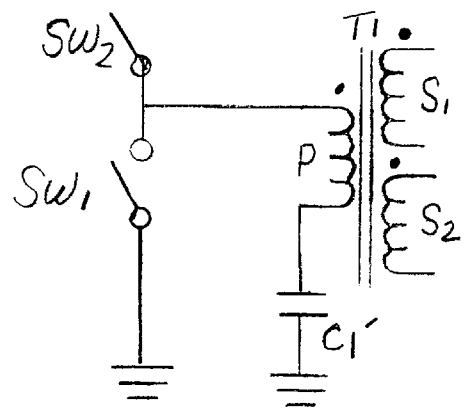
FIGS. 4a–d show four alternative circuit arrangements of capacitors C1, C2, C3 and C4 providing four alternative embodiments for each of the dc power converters of the present invention as shown in either FIG. 1, or FIG. 3.

In FIG. 4a, an alternate embodiment to the coupling of capacitor C1, denoted as C1' herein, is shown. The primary capacitor C1' may be connected in series with the grounded end of the Transformer T1 primary P instead of the driven end as shown in FIGS. 1 and 3.

Figure 4B:
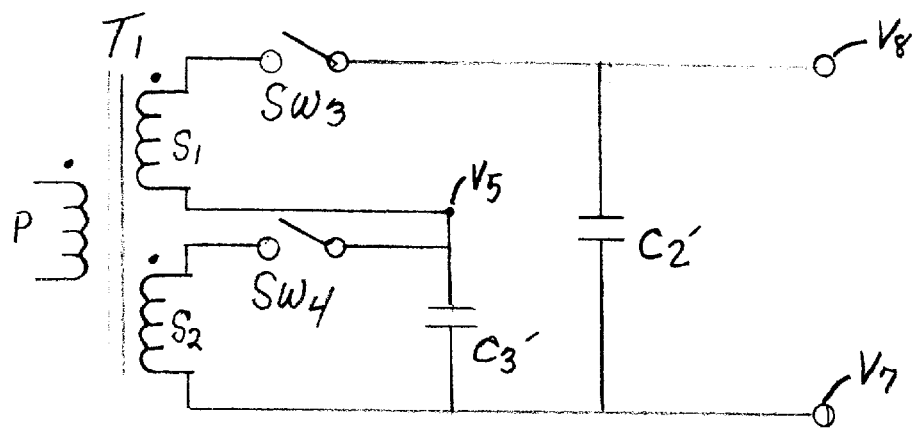
Figure 4C:
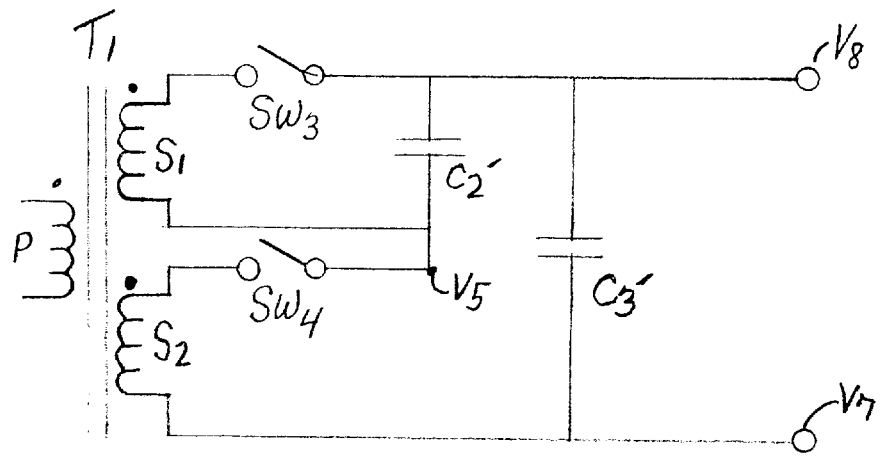
Figure 4D:
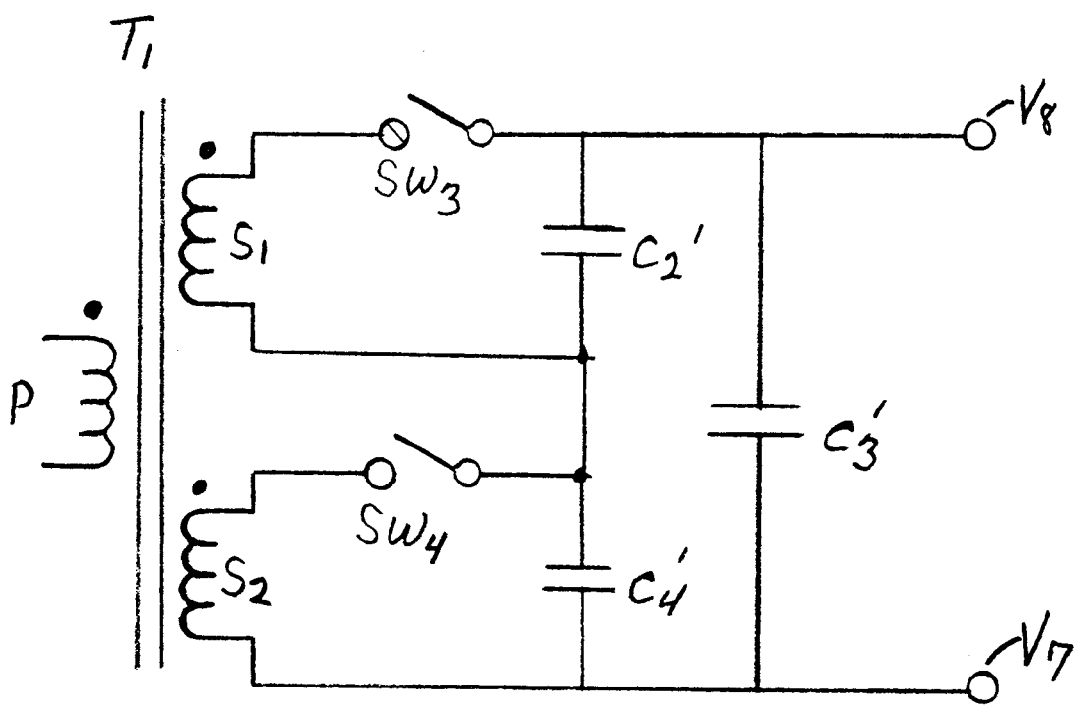

Additionally, In FIGS. 4b–d, alternate embodiments to the coupling of capacitors C2 and C3, and an additional capacitor C4, denoted as C2' C3' and C4' herein, are shown. The transformer T1 secondaries S1 and S2 capacitors C2' or C3' may have either capacitor C2' or C3' be connected across the entire output of the transformer T1, V8–V7, instead of from one side, V7 or V8, to the center connection V5. Additionally, three capacitors C2' C3' and C4' may be coupled across each secondary S1 and S2 and the entire secondary circuit, between V7 and V8, as shown in FIG. 4d.

It should be noted however that the dc power converters 10 and 20 of FIG. 1, FIG. 3, or FIG. 4d have the advantage of electrical symmetry in regard to the coupling of C2, C3, and C4, and those arrangements may give better operation.

Figure 5:
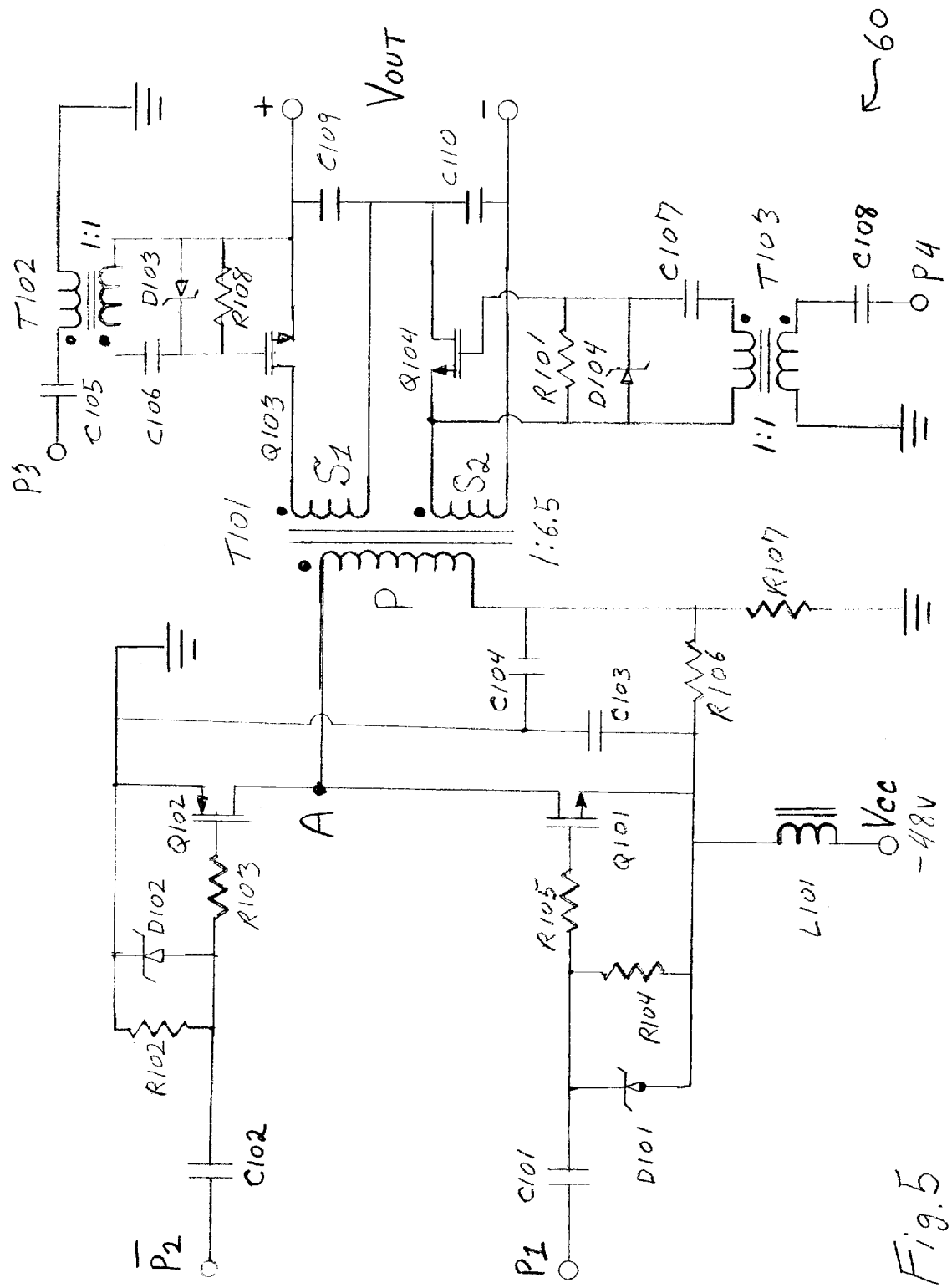
FIG. 5 shows an exemplary dc power converter having bipolar output and bidirectional reactive current transfer embodying the present invention.

Referring now to FIG. 5, an exemplary dc power converter having bipolar output and bidirectional reactive current transfer embodying the present invention is shown ("power conversion circuit 60" hereinafter.) Note: The electronic components used in this exemplary power conversion circuit are identified and listed in Table 1 at the end of this section. Additionally, the previous descriptions or requirements for component selection are applicable unless otherwise stated.

In this exemplary dc power conversion circuit 60, Q101 is an N channel MOSFET and is analogous to SW1, Q102 is a P channel MOSFET analogous to SW102, Q103 is an N channel MOSFET analogous to SW103, and Q104 is an N channel MOSFET analogous to SW104 (Refer to FIG. 1–4 for SW1–4.) The input drive signals to Q101–104 are input at P–P4, and in this exemplary power conversion circuit 60 comprise 10 volt nominal signals having varying duty cycle ratio. The input drive signals P1–4 are generated by a circuit relative to circuit ground (not shown herein), which is also the primary side circuit reference. For this exemplary circuit, an input drive signal at P1 having a duty cycle less than 50% results in a power conversion circuit 60 Vout that is a negative polarity. If the input drive signal at P1 has a duty cycle greater than 50%, this results in a power conversion circuit 60 Vout that is a positive polarity, and an input drive signal at P1 having a duty cycle equal to 50% results in a power conversion circuit 60 Vout that is zero volts.

Since the Q101–104 MOSFET source terminals are not at circuit ground, a coupling means is provided to shift the input drive signals to the levels needed at the Q101–104 MOSFET gate terminals. For MOSFET Q101, the coupling is achieved using C101, D101, and R104 to couple the input P1 to Q101. The resistor R105 coupled at the gate of Q101 is intended to prevent parasitic oscillations in Q101. For MOSFET Q102, the coupling is achieved using C102, D102, and R102 to couple the input P2 to Q102. The resistor R103, coupled at the gate of Q102, is intended to prevent parasitic oscillations in Q102.

Capacitor C104 couples the variable duty cycle waveform at point A, derived from the input drive signals P1–2, to the transformer T101 primary P and also blocks the DC component. Capacitor C103, coupled to C104, is the local reservoir for pulse currents, and inductor L101, a ferrite bead choke, reduces noise coupling back to the power supply.

Resistors R106 and R107 balance the voltage on the capacitor C104 at half of the input power voltage (–42 to –60 volts at Vcc, nominal is ≈–48 volts dc) in the case when both MQSFET switches Q101 and Q102 are left turned off for a long period of time. In some cases, it may be desirable to use gate drive coupling transformers and associated circuitry to drive Q101 and Q102, as is shown for Q103 and Q104, because this removes potential problems due to noise or common mode voltages on supplied from Vcc.

The secondary switches MOSFETS Q103 and Q104 comprise isolated drive circuits. The isolated drive circuits are necessary since the sources of Q103 and Q104 vary in voltage according to the output voltage. Capacitors C105, C106, and transformer T102 are used to couple the input drive signal from P3 to the Q103 gate; and Capacitors C107, C108, and transformer T103 are used to couple the input drive signal from P4 to the Q104 gate. D103 and R108 clamp the input drive signal's lower similarly, D104, and R101 clamp the input drive signal's lower waveform level with the voltage on the Q104 source.

Both of the Q103 and Q104 gate drive coupling circuits use a transformer, T102 and T103 respectively, so that the instantaneous voltage on the source of the MOSFET switch Q103 and Q104 will not affect the magnitude of the gate drives. Transformers T102 and T103 comprise bifilar windings on toroid cores, both primary and secondary, so that they can transmit high frequency drive waveforms with substantial current to the gates of the associated MOSFET devices. T102 and T103 have a nominal Lp≧2 mH at 50 kHz. Although not shown herein, it is possible in some simpler embodiments to omit the transformers T102 and T103 used in the gate drive coupling circuits. e.g. the T102 and T103 secondary windings are actually secondary windings of T101. In this alternate embodiment the input drive signals of P3 and P4 are generated from T101, thus removing the need for the P3 and P4 pulse drive circuitry and the transformers T102 and T103.

The output voltage from the power conversion circuit 60 is developed across the capacitors C109 and C110. The difference of the two rectified secondary voltages across C109 and C110 is the output Vout. Note that the secondary connections for Q104 have been rearranged in comparison to SW4 of FIG. 1, and as was also shown in FIGS. 3 and 4. By using a switch Q104 which is fully floating, it is possible to wind the transformer secondaries S101 and S102 as a bifilar winding, with near unity coupling as in this exemplary embodiment. The interwinding capacitance of about 500 pF has only a DC voltage applied to it and appears effectively in parallel with C110, so it has no effect on the switching energy used to drive the transformer T103. In addition, the two secondary windings S1 and S2 will have very good coupling, so that whatever voltage appears across one winding will appear across the other winding. This permits the inherent body diodes present in Q103 and Q104 to serve as the leakage inductance energy clamp for the opposite transistor, Q104 and Q103 respectively, in the secondary circuit.

Recovered energy stored in the transformer T101 leakage inductance is returned to the transformer T101 primary P. A non-dissipating energy clamp is thereby created, substantially enhancing the converter efficiency. As a result, it is not necessary for the transformer T101 to have an extremely small leakage reactance, and power absorbing spike snubbers are not required. Snubber circuits, by the very nature of their absorbing spike energy, reduce the maximum available circuit efficiency. Designing T101 to have a definite and substantial value of leakage reactance can be done to help enhance the efficiency of the power converter. The leakage reactance of the transformer T101 is used to temporarily store the energy present in the source-drain capacitance's of Q103 and Q104 during transitions, so that Q103 and Q104 are operated in a zero-voltage turn-on switching mode.

Having the voltage across Q103 and Q104 be near zero when the transistor is turned ON minimizes power loss due to discharging the device capacitance. For this operating mode, the control pulses from P3 and P4 to Q103 and Q104 are delayed by a small amount of time from the times when the primary drive waveform changes, to allow time for the secondary to execute a half-cycle resonant ringing waveform from its most positive level to its most negative level. The body diode of the MOSFET Q103 and Q104 carries the load current during the first portion of time before Q103 or Q104 turns ON. A feature of the power conversion circuit 60 of the present invention is that because MOSFET transistors Q103 and Q104 are bidirectional, resistive devices when ON, current flows in both directions through Q103 and Q104. The direction of average current flow depends on the direction of load current flow. Both secondary sections develop a positive output voltage, but in the presence of a reactive load, current flow is reversed in one section, and thus it is seen that one secondary section is providing power to the load at the same time that the other secondary section is actually absorbing power and returning it back to the primary side of the power conversion circuit 60.

The power conversion circuit 60 in this exemplary DC power converter of the present invention has a nominal rating of 96 Vrms output at 56 Watts peak for an input drive signal having a duty cycle that is substantially 25–75%.

TABLE 1

FIG. 5 Component Identification

| Item Number | Item Value/ Identification | Notes: |
|---|---|---|
| Q101 | IRF540N | SW1 Switch |
| Q102 | IRF9540N | SW2 Switch |
| Q103 | IRF820N | SW3 Switch |
| Q104 | IRF820N | SW4 Switch |
| R101 | 10K Ω | |
| R102 | 22K Ω | |
| R103 | 10 Ω | |
| R104 | 22K Ω | |
| R105 | 10 Ω | |
| R106 | 100K Ω | |
| R107 | 100K Ω | |
| R108 | 10K Ω | |
| C101 | 47 nf | |
| C102 | 47 nf | |
| C103 | 680 μf | |
| C104 | 220 μf | |
| C105 | 22 nf | |
| C106 | 22 nf | |
| C107 | 22 nf | |
| C108 | 22 nf | |
| C109 | 1 μf | Low loss at the switching frequency |
| C110 | 1 μf | Low loss at the switching frequency |
| D101–D104 | 1N5242 | 12 V, 500 MW Zener |
| T101 | 1:6.5 | Typical RDC = .13 Ω Secondaries S1, S2 are bifilar wound. Power capacity designed at substantially a 50 kHz square wave. |
| T102–T103 | 1:1 | Bifilar wound on a toroid core. Lp ≧ 2 mH at 50 kHz. |
| L101 | Typical ≈ 10 μH | Ferrite bead choke |

Figure 6:
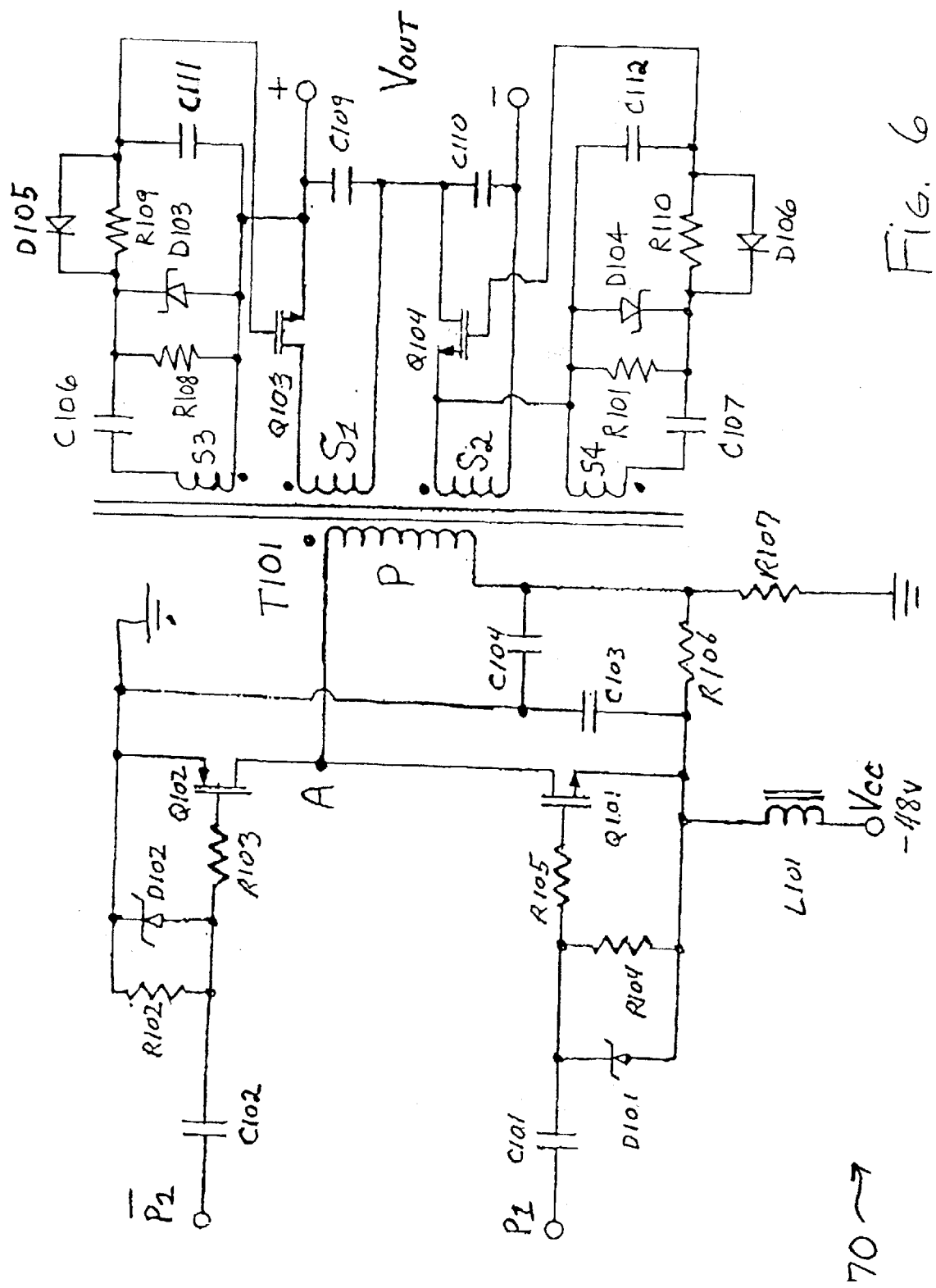
FIG. 6 shows a second exemplary dc power converter having bipolar output and bidirectional reactive current transfer embodying the present invention.

Referring now to FIG. 6, a second exemplary dc power converter having bipolar output and bidirectional reactive current transfer embodying the present invention is shown ("power conversion circuit 70" hereinafter.) In this second exemplary dc power conversion circuit 70, the previous description applicable to FIG. 5 is applicable unless otherwise stated. Additionally, the electronic components used herein where different from those of FIG. 5 and Table 1 are identified and listed in Table 2 at the end of this section, and previous descriptions or requirements for component selection are applicable unless otherwise stated.

The secondary switches MOSFETS Q103 and Q104 comprise isolated drive circuits. The isolated drive circuits are necessary since the sources of Q103 and Q104 vary in voltage according to the output voltage.

This second exemplary embodiment of FIG. 6 differs from that of FIG. 5 in that the input drive signals of P3 and P4, drive inputs P3 and P4, the transformers T102 and T103 and some associated circuitry have been eliminated. The replacement source for these drive signals comprise two additional secondaries S3 and S4 that are bifilar wound upon the transformer T101. Coupled to these secondaries S3 and S4 are substantially the same components as shown in FIG. 5 except as noted below.

As discussed in reference to FIG. 5, the leakage reactance of the transformer T101 is used to temporarily store the energy present in the source-drain capacitance's of Q103 and Q104 during transitions, so that Q103 and Q104 are operated in a zero-voltage turn-on switching mode. Having the voltage across Q103 and Q104 be near zero when the transistor is turned ON minimizes power loss due to discharging the device capacitance. For this operating mode, the control pulses from the secondaries S3 and S4, to Q103 and Q104, are delayed by a small amount of time from the time when the primary drive waveform changes to allow time for the secondary to execute a half-cycle resonant ringing waveform from its most positive level to its most negative level. To achieve this turn-on delay, R109, C111 and D105 provide an RC turn-on delay circuit and a fast turn-off circuit for Q103; and similarly R110, C112 and D106 provide an RC turn-on delay circuit and a fast turn-off circuit for Q104.

TABLE 2

FIG. 6 Additional Component Identification

| Item Number | Item Value/ Identification | Notes: |
|---|---|---|
| R109 | 330 Ω | RC Turn_On Delay |
| R110 | 330 Ω | RC Turn_On Delay |
| C111 | 1 nf | RC Turn_On Delay |
| C112 | 1 nf | RC Turn_On Delay |
| D105–D106 | 1N4148 | Fast Turn-Off |
| T101 | 1:6.5 | Typical RDC = .13 Ω Secondaries S1, S2 are bifilar wound. Power capacity designed at substantially a 50 kHz square wave. Secondaries S3, S4 are bifilar wound. |

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A dc power converter having bipolar output and bi-directional reactive current transfer, comprising in combination:
   a modulator coupled to a direct current source, said modulator comprising at least two switching means for generating a waveform pulse;
   a primary winding of a transformer capacitively coupled to said modulator;
   at least two secondary windings of said transformer magnetically coupled to said primary winding of said transformer;
   wherein said at least two secondary windings are bifilar wound;
   a first synchronous rectifier coupled to a first secondary winding of said at least two secondary windings comprising:
      a first switching means for interrupting a current path connected in series with said first secondary winding; and
      a first capacitor coupled in series with said first switching means;
   a second synchronous rectifier coupled to a second secondary winding of said at least two secondary windings comprising:
      a second switching means for interrupting a current path connected in series with said second secondary winding; and
      a second capacitor coupled in series with said second switching means; and
   said first secondary winding coupled said second secondary winding such that an output voltage from said first synchronous rectifier is in electrical opposition to a second output voltage from said second synchronous rectifier.

2. A dc power converter as in claim 1 wherein said switching means comprise semiconductor devices.

3. A dc power converter as in claim 2 wherein said semiconductor devices comprise MOSFET devices.

4. A dc power converter as in claim 1 wherein an electrical path between said direct current source and said first capacitor is devoid of diodes, and an electrical path between said direct current source and said second capacitor is devoid of diodes.

5. A dc power converter as in claim 1 wherein said first secondary winding and said second secondary winding are of the same polarity.

6. A dc power converter having bipolar output and bi-directional reactive current transfer, comprising in combination:
   a modulator coupled to a direct current source, said modulator comprising at least two switching means for generating a waveform pulse;
   a primary winding of a transformer capacitively coupled to said modulator;
   at least two secondary windings of said transformer magnetically coupled to said primary winding of said transformer;
   a first synchronous rectifier coupled to a first secondary winding of said at least two secondary windings comprising:
      a first switching means for interrupting a current path connected in series with said first secondary winding; and
      a first capacitor coupled in series with said first switching means;
   a second synchronous rectifier coupled to a second secondary winding of said at least two secondary windings comprising:
      a second switching means for interrupting a current path connected in series with said second secondary winding; and
      a second capacitor coupled in series with said second switching means; and said first secondary winding coupled said second secondary winding such that an output voltage from said first synchronous rectifier is in electrical opposition to a second output voltage from said second synchronous rectifier;

at least one clamp diode connected in parallel with at least one switching means, wherein said at least one switching means comprises one or more of:

said at least two switching means for generating a wave form pulse;

said first switching means for interrupting a current path; and said second switching means for interrupting a current path;

wherein said first secondary winding and said second secondary winding are of the same polarity; and wherein said at least two secondary windings are bifilar wound.

7. A dc power converter as in claim 6 wherein said switching means comprise semiconductor devices.

8. A dc power converter as in claim 7 wherein said semiconductor devices comprise MOSFET devices.

9. A dc power converter as in claim 6 wherein an electrical path between said direct current source and said first capacitor is devoid of diodes, and an electrical path between said direct current source and said second capacitor is devoid of diodes.

10. A dc power converter having bipolar output and bi-directional reactive current transfer, comprising in combination:

a modulator coupled to a direct current source, said modulator comprising at least two switching means for generating a waveform pulse;

a primary winding of a transformer capacitively coupled to said modulator;

at least two secondary windings of said transformer magnetically coupled to said primary winding of said transformer;

a first synchronous rectifier coupled to a first secondary winding of said at least two secondary windings comprising:

a first switching means for interrupting a current path connected in series with said first secondary winding; and a first capacitor coupled in series with said first switching means;

a second synchronous rectifier coupled to a second secondary winding of said at least two secondary windings comprising:

a second switching means for interrupting a current path connected in series with said second secondary winding; and a second capacitor coupled in series with said second switching means; and said first secondary winding coupled said second secondary winding such that an output voltage from said first synchronous rectifier is in electrical opposition to a second output voltage from said second synchronous rectifier.

11. A dc power converter as in claim 10 wherein said switching means comprise semiconductor devices.

12. A dc power converter as in claim 11 wherein said semiconductor devices comprise MOSFET devices.

13. A dc power converter as in claim 10 wherein an electrical path between said direct current source and said first capacitor is devoid of diodes, and an electrical path between said direct current source and said second capacitor is devoid of diodes.

14. A dc power converter as in claim 10 wherein said first secondary winding and said second secondary winding are of the same polarity.

15. A dc power converter as in claim 10 wherein said at least two secondary windings are bifilar wound.

16. A dc power converter as in claim 10 further comprising at least one clamp diode connected in parallel with at least one switching means, wherein said at least one switching means comprises one or more of:

said at least two switching means for generating a waveform pulse;

said first switching means for interrupting a current path; and said second switching means for interrupting a current path.

* * * * *